United States Patent
Bailey

(10) Patent No.: US 6,191,728 B1
(45) Date of Patent: Feb. 20, 2001

(54) AGILE SATELLITE TARGETING

(75) Inventor: David A. Bailey, Glendale, AZ (US)

(73) Assignee: Honeywell International Inc., Morristown, NJ (US)

(*) Notice: Under 35 U.S.C. 154(b), the term of this patent shall be extended for 0 days.

(21) Appl. No.: 09/348,842

(22) Filed: Jul. 7, 1999

(51) Int. Cl.[7] .................................................. H04B 7/185
(52) U.S. Cl. ........................ 342/355; 244/164; 244/165; 244/171; 701/13
(58) Field of Search ........................... 342/355; 244/164, 244/165, 171; 701/13

(56) References Cited

U.S. PATENT DOCUMENTS

| | | | |
|---|---|---|---|
| 4,599,697 | * 7/1986 | Chan et al. | 244/169 |
| 4,858,858 | * 8/1989 | Bruederle | 244/165 |
| 6,047,927 | * 4/2000 | Heiberg et al. | 244/165 |

* cited by examiner

Primary Examiner—Theodore M. Blum
(74) Attorney, Agent, or Firm—Robert E. Greenstien

(57) ABSTRACT

A method is disclosed for targeting a satellite orbiting earth between to sites on earth based on an access time that is transmitted from a ground station. Control momentum gyros are used to change the satellite's attitude for targeting. A gryo rate is selected based the longest time to target. The longest time is a value selected from the access time, the time to reach the target based on the satellite's attitude and the time to reach the target based on the gyro rate.

6 Claims, 1 Drawing Sheet

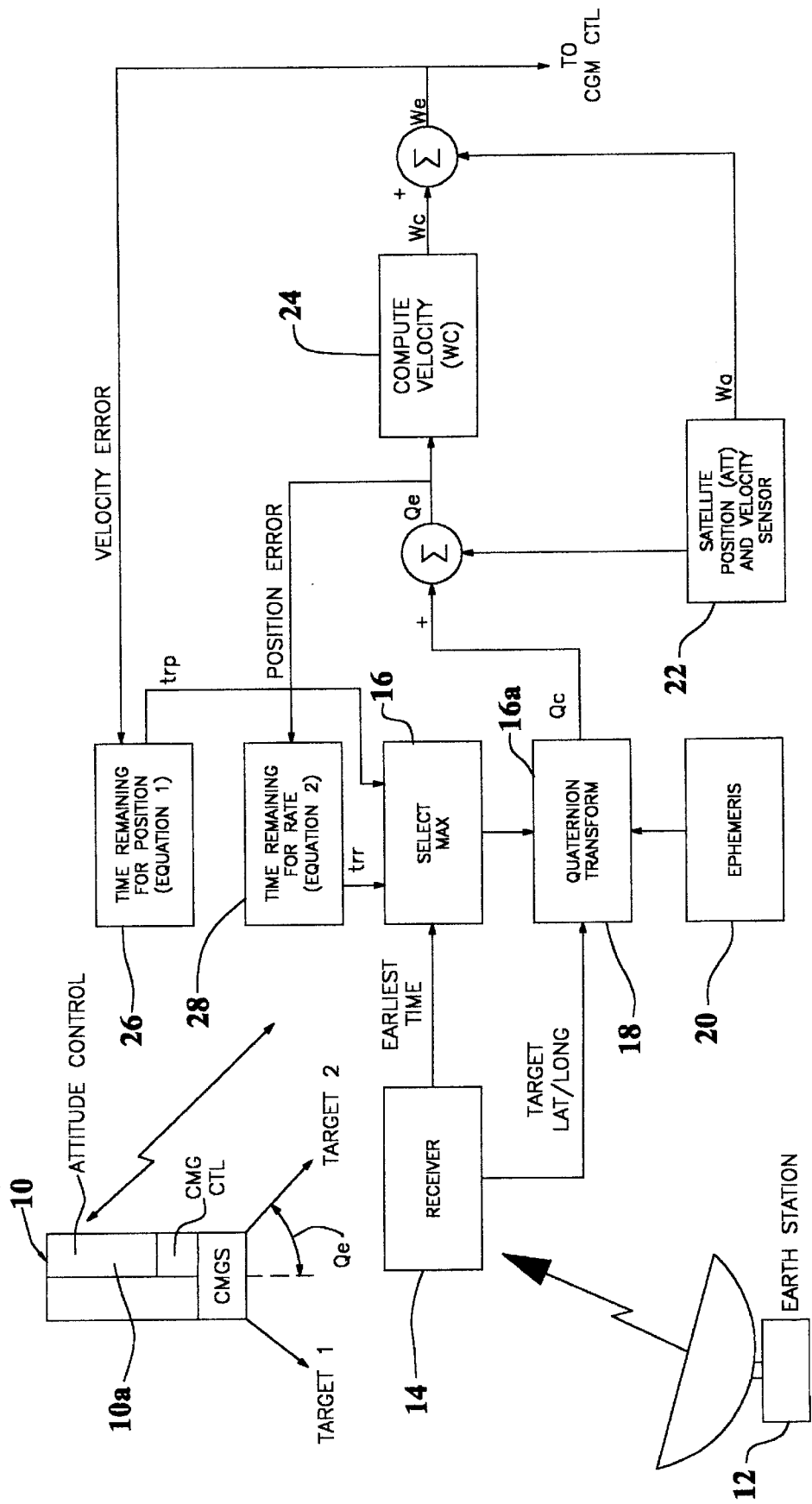

AGILE SATELLITE TARGETING

TECHNICAL FIELD

This invention relates to satellite attitude control, in particular, pointing an orbiting satellite at different ground based locations.

BACKGROUND OF THE INVENTION

Many satellites are reoriented during orbit to point ("target") different earth sites at specific times, e.g., pan between targets 1 and 2 in the drawing. In the state of the art, the targets are scheduled by an "access time" on the ground and the target location along with the access time are transmitted to satellite through a satellite uplink. As the satellite moves along its orbit, attitude control devices, such as control momentum gyros (CMG), are operated to change the satellites attitude, preferably in a continuous maneuver without stopping at any attitude, to reduce the maneuver time, i.e., target as many locations in the least amount of time and access each target at the scheduled access time. The maneuver requires the use of known Quaternion Transforms (see for example, Bong Wie, *Space Vehicle Dynamics and Control*, AIAA), and satellite ephemeris to define a satellite's orbit location and attitude in a planning algorithm that allots a margin of time to each reorientation maneuver to guarantee, within an acceptable probability of success, that the maneuver will be completed in time to properly site the target, e.g., collect data form the site. But the accumulated margin of time over several targets can allow an additional target to targeted. In other words, the maneuver time margin reduces the number of targets per unit of time. Despite this, the target schedule may not be met for every target because in a typical agile satellite using a so called pseudo inverse to control CMG gimbal angles, the "robustness" or speed at which the satellite can be reoriented varies with the CMG gimbal angles, which determine the available angular momentum. If the gimbal angles bring the pseudo inverse close to a "singular" condition, where the array gain is reduced, the maneuver will take longer that expected.

SUMMARY OF THE INVENTION

Objects of the present invention include providing a technique to increase the number of targets that can be cited in a unit of time.

According to the invention, the margin of error per target is substantially reduced by allowing the control system on the satellite to "reschedule" the time at which it should be pointing at a target (access position) by a fraction of a second to several seconds from the original schedule if the original schedule cannot be met.

According to the invention, the time (access time) is determined separately based on attitude error and reorientation velocity. The time used by the Quaternion and ephemeris is the latest or maximum access time selected from three values: the scheduled access time, the access times for the velocity and the position error.

Other objects benefits and features of the invention will be apparent to one ordinary skill in the art from the drawing and following description.

BRIEF DESCRIPTION OF THE DRAWING

The drawing is a functional block diagram of a satellite and attitude control system embodying the present invention.

DETAILED DESCRIPTION

In the drawing, a satellite 10 is presumed to be in orbit, in this case around an earth station 12 that transmits a set of target coordinates (Lat and Lon) and desired target access time for targets 1 and 2, requiring the satellite to rotate between the two targets(an attitude change). The coordinates are received by an on board receiver 14 which is part of system 10a to control a set of CMGs, operated by a CMG control, to reposition the satellite to the target by performing the calculations and operations discussed below. For that purpose, the system 10a can be assumed to include a programmable signal processor or computer in unit 10a to carry out the following sequences cyclically, many times per second. The receiver 14 produces two outputs, the "earliest" or desired time to the target position and the Lat. and Lon. for the target. But the earliest time is one of three inputs used in a maximum select operation 16. The other two inputs are the time remaining for "position error" ($Q_e$), the difference between where the attitude should be to reach the target according to the schedule and the actual attitude, and for "velocity error", the difference in the actual rate of change $\omega_a$ in the attitude velocity and the rate scheduled $\omega_c$ to be at the target. The output 16a from the maximum select operation or function, which selects the longest or latest of the three times each time the function is run, is the time that is used in a quaternion function 18, which, using the output 20a from an ephemeris 20 calculates a commanded satellite attitude $Q_c$. The selection can change from cycle to cycle. The attitude error $Q_e$ is also calculated by comparing $Q_c$ with actual satellite attitude velocity $Q_a$, produced from an attitude sensor system 22. The position error $Q_e$ is used in known calculation 24, such as $$\frac{k(\tau s + 1)}{s}$$

to determine a desired position change rate command $\omega_c$, which is compared to the actual rotational velocity $\omega_a$, from system 22, producing a velocity error $\omega_e$. The position error $Q_e$ is used in a function 28 to determine, using the following equation 1, the time remaining $t_{rp}$ to reach the target position, and the rotational velocity error $\omega_e$ is supplied to function 26, which uses equation 2 to determine the time remaining $t_{rr}$ to reach the target position. Those two times are applied to the maximum time select function 16, which selects, from the three times, earliest, $t_{rp}$ and $t_{rr}$, the longest one for use in the Quaternion. At any instant, the rate of the CMGs is a function of $\omega_e$.

$$t_{rp} = t_s + \sqrt{\frac{2\Theta_e}{a}} \tag{1}$$

where the time remaining $t_{rp}$ is the settling time $t_s$ once the position is correct plus the time to move the remaining angle $\Theta_e$ and a is a constant deceleration. To compute the rate or velocity delay:

$$t_{rr} = t_{ss} + \frac{\omega_e}{a} \tag{2}$$

where $\omega_e$ is the rate at which the satellite's attitude changes.

Although the invention has been shown and described with respect to exemplary embodiments thereof, it should be understood by those skilled in the art that various changes, additions and combinations of the features, components and functions disclosed herein may be made without departing from the spirit and scope of the invention.

What is claimed is:

1. A method for targeting an orbiting satellite, comprising:

transmitting a target position and access time for the target to the satellite;

receiving the target position and access time on the satellite;

producing on the satellite a first time remaining signal by determining the time remaining to reach the target position as a function of a position error signal manifesting the difference between a desired satellite attitude and actual satellite attitude;

producing on the satellite a second time remaining signal by determining on the satellite the time remaining to reach the target position as a function of a position error signal manifesting the difference between a desired attitude velocity for said position error signal and actual satellite attitude velocity;

selecting the longest time between the access time and first and second time remaining signals; and producing said desired satellite attitude as a function of said longest time.

2. The method described in claim 1, wherein:

said step of producing said desired attitude comprises controlling a set of controlled momentum gyros.

3. The method described in claim 1, wherein:

said first time remaining signal is produced using a function that includes $$t_s + \sqrt{\frac{2\Theta_e}{a}}$$

where $t_s$ is the settling time once the satellite attitude is correct, the remaining angle is $\Theta_e$ and a is a constant deceleration.

4. The method described in claim 2, wherein:

said first time remaining signal is produced using a function that includes $$t_s + \sqrt{\frac{2\Theta_e}{a}}$$

where $t_s$ is the settling time once the satellite attitude is correct, the remaining angle is $\Theta_e$ and a is a constant deceleration.

5. The method of claim 3, wherein:

said second remaining time signal is produced using a function that includes $$t_s + \frac{\omega_e}{a}$$

where $\omega_e$ is the angular rate for the satellite.

6. The method of claim 4, wherein:

said second remaining time is produced using a function that includes $$t_s + \frac{\omega_e}{a}$$

where $\omega_e$ is the angular rate for the satellite.

* * * * *